(12) United States Patent
Nakashima

(10) Patent No.: US 8,695,724 B2
(45) Date of Patent: Apr. 15, 2014

(54) HAND-HELD POWER TOOL

(75) Inventor: Keiji Nakashima, Anjo (JP)

(73) Assignee: Makita Corporation, Anjo-shi (JP)

( * ) Notice: Subject to any disclaimer, the term of this patent is extended or adjusted under 35 U.S.C. 154(b) by 604 days.

(21) Appl. No.: 12/935,605

(22) PCT Filed: Apr. 1, 2009

(86) PCT No.: PCT/JP2009/056826
§ 371 (c)(1),
(2), (4) Date: Dec. 2, 2010

(87) PCT Pub. No.: WO2009/123267
PCT Pub. Date: Oct. 8, 2009

(65) Prior Publication Data
US 2011/0100665 A1 May 5, 2011

(30) Foreign Application Priority Data
Apr. 4, 2008 (JP) ................... 2008-098568

(51) Int. Cl.
*B25D 17/00* (2006.01)
*B23B 45/16* (2006.01)
*B25D 9/00* (2006.01)
*B25D 11/00* (2006.01)
*B25D 13/00* (2006.01)
*B25D 16/00* (2006.01)

(52) U.S. Cl.
USPC ........................................ 173/162.2; 173/210

(58) Field of Classification Search
CPC ........ B25F 5/026; B25F 5/006; B25D 17/043
USPC ................ 173/162.1–162.2, 210–211, 170
See application file for complete search history.

(56) References Cited

U.S. PATENT DOCUMENTS 3,845,827 A * 11/1974 Schulin ..................... 173/162.1
4,021,998 A * 5/1977 Greenhill ..................... 56/241
(Continued)

FOREIGN PATENT DOCUMENTS

EP 1 270 151 A1 1/2003
EP 1514 648 A2 3/2005
(Continued)

OTHER PUBLICATIONS

Jul. 1, 2011 Search Report issued in European Application No. 09728013.5.
(Continued)

*Primary Examiner* — Robert Long
(74) *Attorney, Agent, or Firm* — Oliff PLC

(57) ABSTRACT

A technique for reducing the costs of manufacturing an auxiliary handle provided separately from a main handle in a hand-held power tool is provided. A hand-held power tool includes a power tool body having a front end region to which a tool bit can be mounted, a main handle that is disposed on a rear end side of the power tool body opposite from the tool bit, an auxiliary-handle mounting member for mounting an auxiliary handle, and longitudinally elastic elements that are disposed between the power tool body and the auxiliary handle mounting member in the axial direction of the tool bit and can elastically deform in the axial direction. The auxiliary-handle mounting member is allowed to move with respect to the power tool body in the axial direction of the tool bit by elastic deformation of the longitudinally elastic elements, so that transmission of vibration from the power tool body to the auxiliary-handle mounting member in the axial direction is reduced.

11 Claims, 14 Drawing Sheets

(56) References Cited

U.S. PATENT DOCUMENTS

| | | | |
|---|---|---|---|
| 4,282,938 A | | 8/1981 | Minamidate |
| 4,466,188 A | * | 8/1984 | Svendsgaard .................. 30/172 |
| 4,819,742 A | * | 4/1989 | Driggers .................. 173/162.2 |
| 4,825,548 A | * | 5/1989 | Driggers .................. 30/276 |
| 5,025,870 A | * | 6/1991 | Gantner .................. 173/162.2 |
| 5,453,577 A | * | 9/1995 | Everett et al. .................. 173/211 |
| 5,692,574 A | * | 12/1997 | Terada .................. 173/162.2 |
| 5,839,517 A | | 11/1998 | Gwinn et al. |
| 5,927,407 A | * | 7/1999 | Gwinn et al. .................. 173/162.2 |
| 6,076,616 A | * | 6/2000 | Kramp et al. .................. 173/162.2 |
| 6,863,479 B2 | * | 3/2005 | Frauhammer et al. .... 408/241 R |
| 7,137,542 B2 | * | 11/2006 | Oki et al. .................. 173/162.2 |
| 8,430,183 B2 | * | 4/2013 | Di Nicolantonio et al. .................. 173/162.2 |
| 2003/0006051 A1 | * | 1/2003 | Schmitzer et al. .................. 173/49 |
| 2005/0082072 A1 | * | 4/2005 | Nicolantonio et al. .... 173/162.2 |
| 2006/0289183 A1 | * | 12/2006 | Schreiber .................. 173/162.2 |
| 2008/0202785 A1 | * | 8/2008 | Fischer et al. .................. 173/162.2 |
| 2010/0282484 A1 | * | 11/2010 | Moessnang et al. ....... 173/162.2 |
| 2011/0011609 A1 | * | 1/2011 | Simm et al. .................. 173/171 |

FOREIGN PATENT DOCUMENTS

| | | |
|---|---|---|
| JP | A-59-47171 | 3/1984 |
| JP | A-2001-88059 | 4/2001 |

OTHER PUBLICATIONS

Nov. 30, 2010 International Preliminary Report on Patentability issued in International Application No. PCT/JP2009/056826 (with translation).

International Search Report mailed Jun. 30, 2009 issued in International Patent Application PCT/JP2009/056826 (with translation).

* cited by examiner

HAND-HELD POWER TOOL

FIELD OF THE INVENTION

The invention relates to a vibration-proofing technique of an auxiliary handle in a hand-held power tool, such as a hammer and a hammer drill, which drives a tool bit to reciprocate in a constant cycle.

BACKGROUND OF THE INVENTION

A hand-held power tool such as a hammer of the type which has a main handle and an auxiliary handle and is designed to be operated with the main handle held with one hand and the auxiliary handle with the other hand is known. Such a hammer having a main handle and an auxiliary handle is disclosed, for example, in Japanese non-examined laid-open Patent Publication No. 59-47171.

In the above-mentioned known hammer, the main handle is disposed at the rear of the power tool body, and a detachable auxiliary handle is disposed on the front end side (the hammer bit side) of the power tool body. The auxiliary handle is additionally provided with a vibration-proofing structure in order to reduce transmission of vibration from the power tool body to the auxiliary handle.

In some hammer drills which can be appropriately switched between a hammering operation mode in which only a striking force in the axial direction is applied to a hammer bit and a hammer drill operation mode in which a striking force in the axial direction and a rotating force in the circumferential direction are applied to the hammer bit, a D-shaped auxiliary handle suitable for use in hammering operation and a bar-shaped auxiliary handle suitable for use in hammer drill operation are provided and the two auxiliary handles can be used according to the operation modes.

The detachable auxiliary handle of the above-mentioned known hammer has a vibration-proofing structure in itself. Therefore, as described above, in the case of a power tool in which the auxiliary handles can be used according to the operation modes, each of the auxiliary handles is additionally provided with a vibration-proofing structure, so that the manufacturing costs increase. Therefore, further improvement is required in this point.

SUMMARY OF THE INVENTION

Accordingly, it is an object of the invention to reduce costs for manufacturing an auxiliary handle provided separately from a main handle in a hand-held power tool.

Above-described object is achieved by a claimed invention represented by a hand-held power tool which performs a predetermined operation by linear movement of a tool bit in an axial direction of the tool bit. The hand-held power tool according to the invention includes a power tool body, a main handle, an auxiliary handle and an auxiliary-handle mounting member, and a longitudinally elastic element. The power tool body has a front end region to which the tool bit can be mounted. The main handle is disposed on a rear end side of the power tool body opposite from the tool bit. The auxiliary handle is mounted to the auxiliary handle mounting member. The longitudinally elastic element is disposed between the power tool body and the auxiliary handle mounting member in the axial direction of the tool bit and can elastically deform in the axial direction. The "hand-held power tool" in this invention typically represents an impact tool, such as a hammer and a hammer drill, which performs a hammering operation or a hammer drill operation on a workpiece only by striking movement of the tool bit in its axial direction, or by striking movement and rotation of the tool bit. In addition to the impact tool, it also widely includes a cutting power tool, such as a reciprocating saw and a jig saw, which performs a cutting operation on a workpiece by reciprocating movement of a blade. The "longitudinally elastic element" in this invention typically represents rubber, elastomer or a spring. In the case of the longitudinally elastic element which is fowled, for example, by rubber, the rubber having a ring-like, ball-like or pin-like form can be suitably used.

According to the representative hand-held power tool according to the invention, the auxiliary-handle mounting member is allowed to move with respect to the power tool body in the axial direction of the tool bit by elastic deformation of the longitudinally elastic element, so that transmission of vibration from the power tool body to the auxiliary-handle mounting member in the axial direction is reduced.

According to the invention, as described above, the auxiliary-handle mounting member is designed as a mount for an auxiliary handle designed to be held by a user, and additionally it is provided with a vibration-proofing structure. Therefore, it is not necessary to provide a vibration-proofing structure on the auxiliary handle which is mounted to the auxiliary-handle mounting member. Further, the auxiliary-handle mounting member is connected to the power tool body via the elastic element, so that the structure can be made simpler. Therefore, even an existing auxiliary handle having no vibration-proofing structure can be used as a vibration-proof handle by mounting it to the auxiliary-handle mounting member of the invention. Further, if the auxiliary handle is applied to a power tool such as a hammer drill of the type in which a plurality of auxiliary handles are used according to the operation modes, a simple and low-cost auxiliary-handle vibration-proofing structure can be provided.

According to a further aspect of the invention, the power tool further includes a circumferentially elastic element that is disposed between the power tool body and the auxiliary-handle mounting member in a circumferential direction of the tool bit and can elastically deform in the circumferential direction. The auxiliary-handle mounting member is allowed to move with respect to the power tool body in the circumferential direction of the tool bit by elastic deformation of the circumferentially elastic element, so that transmission of vibration from the power tool body to the auxiliary-handle mounting member in the circumferential direction is reduced.

With such construction, transmission of vibration from the power tool body to the auxiliary-handle mounting member can be reduced not only in the longitudinal direction but also in the circumferential direction.

According to a further aspect of invention, the circumferentially elastic element and the longitudinally elastic element may be defined by the same elastic element. With such a construction, one elastic element can be used both as the circumferentially elastic element and the longitudinally elastic element. Thus the number of parts can be reduced, so that a rational vibration-proofing structure can be realized, According to a further aspect of the invention, at least three circumferentially elastic elements are equidistantly spaced apart from each other in the circumferential direction of the power tool body. With such a construction, elastic forces uniformly act upon an external force inputted from the power tool body, so that effective vibration reducing effect can be obtained. The number of the circumferentially elastic elements in this invention is not limited to three, but four or more circumferentially elastic elements may be provided only if they are equidistantly spaced in the circumferential direction.

According to a further aspect of the invention, the auxiliary-handle mounting member is provided with a dynamic vibration reducer for reducing vibration which is inputted from the power tool body to the auxiliary-handle mounting member. Therefore, with such construction, vibration reducer can reduce vibration which is not completely absorbed by the elastic elements and transmitted to the auxiliary-handle mounting member, so that the vibration reducing effect can be further improved.

According to another aspect of the invention, a hand-held power tool which performs a predetermined operation by linear movement of a tool bit in an axial direction of the tool bit includes a power tool body, a main handle, an auxiliary handle and a longitudinally elastic element. The power tool body has a front end region to which the tool bit can be mounted. The main handle is disposed on a rear end side of the power tool body opposite from the tool bit. The auxiliary handle can be directly held by user's hand. The longitudinally elastic element is disposed between the power tool body and the auxiliary handle in the axial direction of the tool bit and can elastically deform in the axial direction. The "hand-held power tool" in this invention typically represents an impact tool, such as a hammer and a hammer drill, which performs a hammering operation or a hammer drill operation on a workpiece only by striking movement of the tool bit in its axial direction, or by striking movement and rotation of the tool bit. In addition to the impact tool, it also widely includes a cutting power tool, such as a reciprocating saw and a jig saw, which performs a cutting operation on a workpiece by reciprocating movement of a blade. The "longitudinally elastic element" in this invention typically represents rubber, elastomer or a spring. In the case of the longitudinally elastic element which is formed, for example, by rubber, the rubber having a ring-like, ball-like or pin-like form can be suitably used.

According to another aspect of the invention, the power tool body may have a cylindrical barrel on the front end side. Further, the auxiliary handle comprises a cylindrical barrel cover which covers the barrel and is allowed to move with respect to the barrel in the axial direction of the tool bit by elastic deformation of the longitudinally elastic element, so that transmission of vibration from the barrel to the barrel cover in the axial direction is reduced. The longitudinally elastic element is not limited to rubber which has a ring-like, ball-like or pin-like form as described above, but elastomer or a spring can also be appropriately used. Further, a dynamic vibration reducer can be additionally provided.

With such construction, as described above, the barrel cover designed to be held by a user is additionally provided with a vibration-proofing structure. Further, the barrel cover is connected to the barrel via the elastic element. Therefore, transmission of vibration to the barrel cover can be reduced with a simple and low-cost structure.

According to the invention as described above, costs for manufacturing an auxiliary handle provided separately from a main handle in a hand-held power tool can be reduced.

DETAILED DESCRIPTION OF THE INVENTION (First Embodiment of the Invention)

Figure 1:
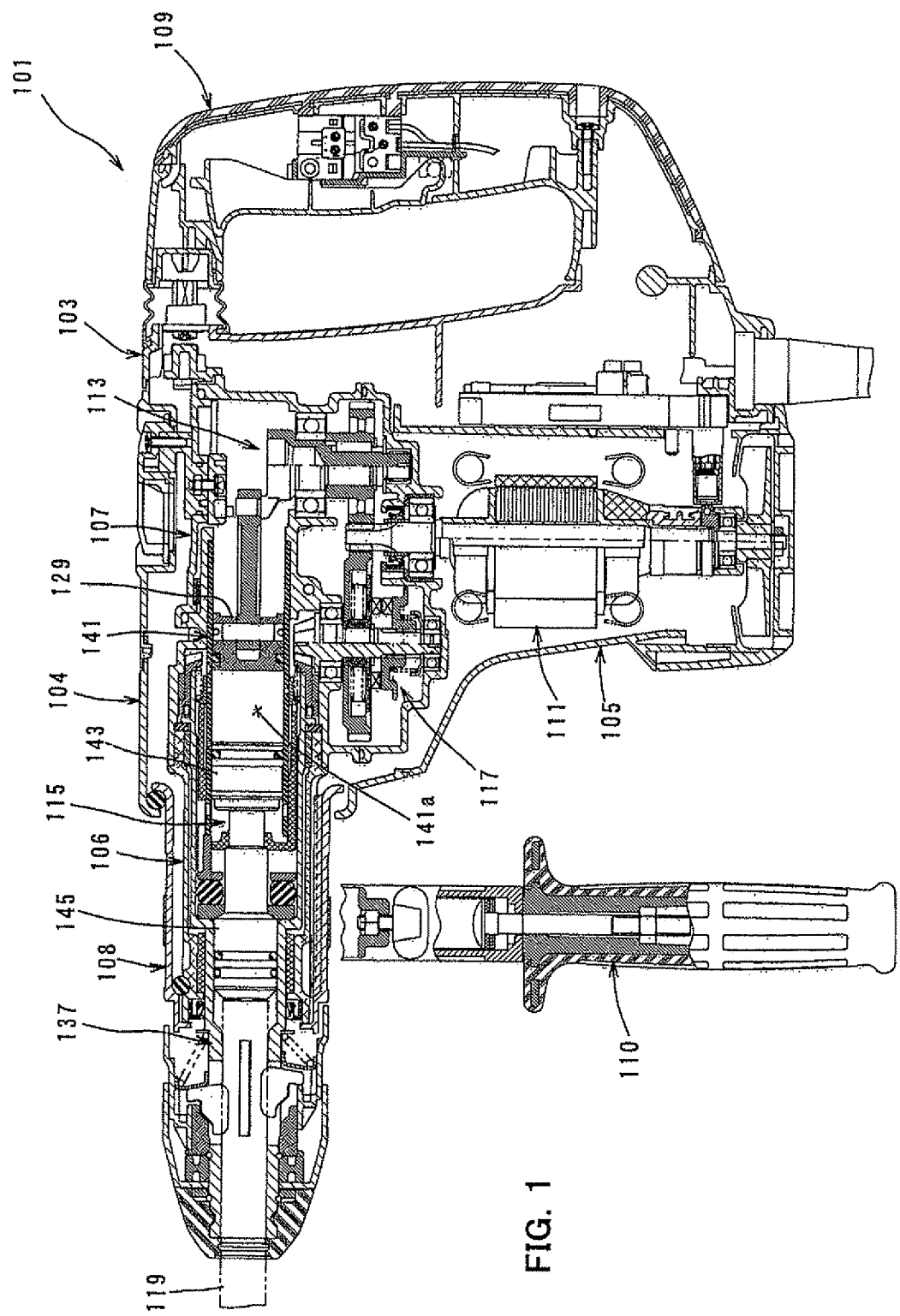
FIG. 1 is a sectional side view showing an entire electric hammer drill according to a first embodiment of the invention.

A first embodiment of the invention is now described with reference to FIGS. 1 to 5. FIG. 1 is a sectional view showing an entire electric hammer drill 101 as a representative example of a hand-held power tool according to the invention. As shown in FIG. 1, the hammer drill 101 of this embodiment mainly includes a body 103 that forms an outer shell of the hammer drill 101, a hammer bit 119 detachably coupled to a front end region (on the left side as viewed in FIG. 1) of the body 103 via a tool holder 137, and a handgrip 109 that is connected to the body 103 on the side opposite from the hammer bit 119 and designed to be held by a user. The body 103, the hammer bit 119 and the handgrip 109 are features that correspond to the "power tool body", the "tool bit" and the "main handle", respectively, according to the invention. The hammer bit 119 is held by the tool holder 137 such that it is allowed to reciprocate with respect to the tool holder 137 in its axial direction and prevented from rotating with respect to the tool holder 137 in its circumferential direction. In the present embodiment, for the sake of convenience of explanation, the side of the hammer bit 119 is taken as the front and the side of the handgrip 109 as the rear.

The body 103 mainly includes a motor housing 105 that houses a driving motor 111, a gear housing 107 that houses a motion converting mechanism 113 and a power transmitting mechanism 117, a barrel 106 that houses a striking mechanism 115, and a gear housing cover 104 that covers the gear housing 107. The rotating output of the driving motor 111 is appropriately converted to linear motion by the motion converting mechanism 113 and then transmitted to the striking mechanism 115. As a result, an impact force is generated in the axial direction of the hammer bit 119 via the striking mechanism 115. Further, the speed of the rotating output of the driving motor 111 is appropriately reduced by the power transmitting mechanism 117 and then transmitted to the hammer bit 119. As a result, the hammer bit 119 is caused to rotate in the circumferential direction.

The motion converting mechanism 113 mainly includes a crank mechanism. The crank mechanism is designed such that, when the crank mechanism is rotationally driven by the driving motor 111, a driving element in the form of a piston 129 forming a final movable member of the crank mechanism linearly moves along the inner wall of a cylinder 141 in the axial direction of the hammer bit. The power transmitting mechanism 117 mainly includes a gear speed reducing mechanism formed by a plurality of gears and serves to transmit the rotating force of the driving motor 111 to the tool holder 137. Thus the tool holder 137 is caused to rotate in the vertical plane, and the hammer bit 119 held by the tool holder 137 rotates. The specific constructions of the motion converting mechanism 113 and the power transmitting mechanism 117 are not directly related to this invention and therefore their description is omitted.

The striking mechanism 115 mainly includes a striking element in the form of a striker 143 that is slidably disposed within the bore of the cylinder 141 together with the piston 129, and an intermediate element in the form of an impact bolt 145 that is slidably disposed within the tool holder 137. The striker 143 is driven via the action of an air spring of an air chamber 141a of the cylinder 141 which is caused by sliding movement of the piston 129. The striker 143 then collides with (strikes) an impact bolt 145 and transmits the striking force to the hammer bit 119 via the impact bolt 145.

In the hammer drill 101 thus constructed, when the driving motor 111 is driven, a striking force is applied to the hammer bit 119 in the axial direction from the motion converting mechanism 113 formed by the crank mechanism, via the striking mechanism 115, and at the same time, a rotating force is also applied to the hammer bit 119 in the circumferential direction via the power transmitting mechanism 117 formed by the gear speed reducing mechanism. Thus, the hammer bit 119 performs a drilling operation on a workpiece (concrete) by a hammering movement in the axial direction and a drilling movement in the circumferential direction.

The hammer drill 101 can be appropriately switched between a hammering operation mode in which only a striking force in the axial direction is applied to the hammer bit 119, and a hammer drill operation mode in which a striking force in the axial direction and a rotating force in the circumferential direction are applied to the hammer bit 119. This construction is not directly related to this invention and therefore its description is omitted.

Figure 2:
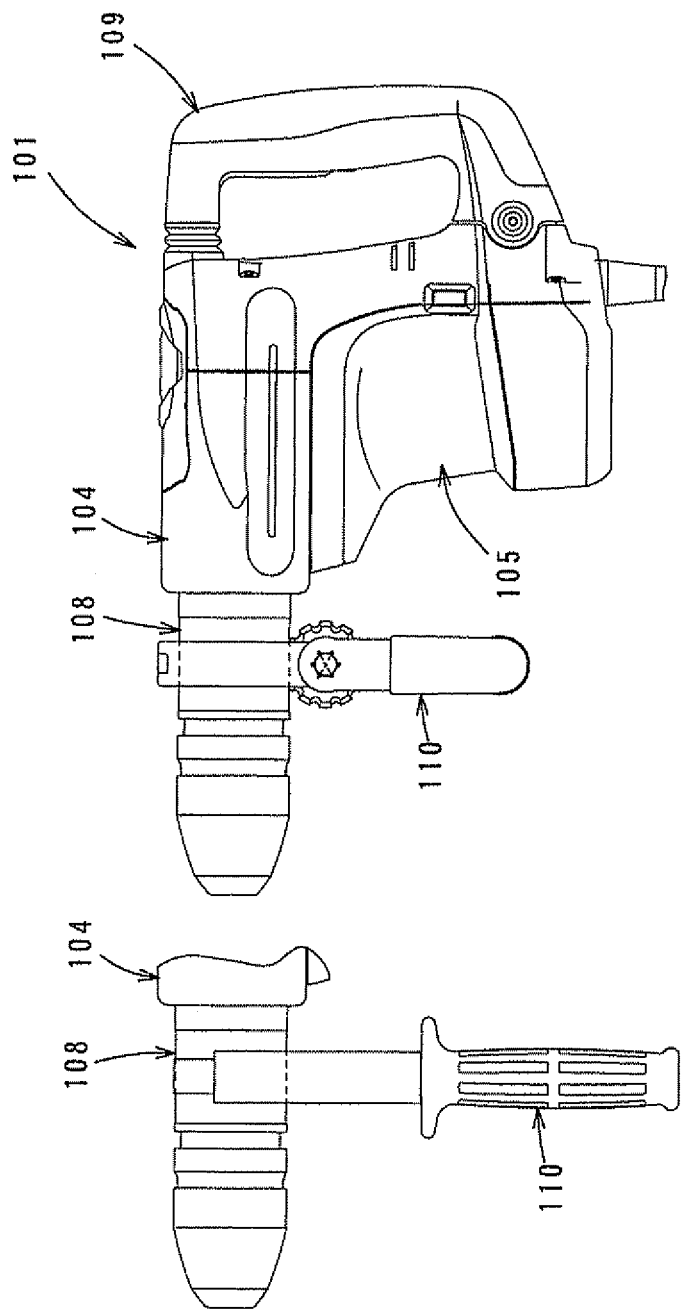
FIG. 2 is a view for showing a bar-shaped side handle and a D-shaped side handle mounted to a body of the hammer drill.

The hammer drill 101 according to this embodiment has a side handle 110 disposed in a front region of the body 103 as well as the main handle or the handgrip 109 disposed at the rear of the body 103. The side handle 110 is a feature that corresponds to the "auxiliary handle" according to the invention. As the side handle 110, a D-shaped side handle suitable for use in hammering operation and a bar-shaped side handle suitable for use in hammer drill operation are provided and the two side handles can be used according to the operation modes. In FIG. 2, the bar-shaped side handle 110 and the D-shaped side handle 110 are shown mounted to the body 103. In the drawing, the left side handle 110 is bar-shaped and the right side handle 110 is D-shaped.

The bar-shaped side handle 110 is designed to extend in a direction transverse to the axial direction of the hammer bit 119 and have one axial end supported on the body 103 and the other free end. The D-shaped side handle 110 is designed to be generally D-shaped when viewed from the front (from the hammer bit 119 side) or from the rear (from the handgrip 109 side). The side handles 110 are configured to be detachably mounted to the barrel cover 108 which is arranged to cover the barrel 106. The structure (method) of mounting the side handles 110 to the barrel cover 108 is not directly related to this invention and therefore its description is omitted.

During operation by the hammer drill 101, vibration is caused in the body 103 by the striking movement of the hammer bit 119. In this embodiment, in order to reduce transmission of vibration from the body 103 to the side handle 110, a barrel cover 108 on which the side handle 110 is mounted is provided with a vibration-proofing structure. The barrel cover 108 is a feature that corresponds to the "auxiliary-handle mounting member" according to this invention. The vibration-proofing structure of the barrel cover 108 is now described with reference to FIGS. 3 to 5.

Figure 3:
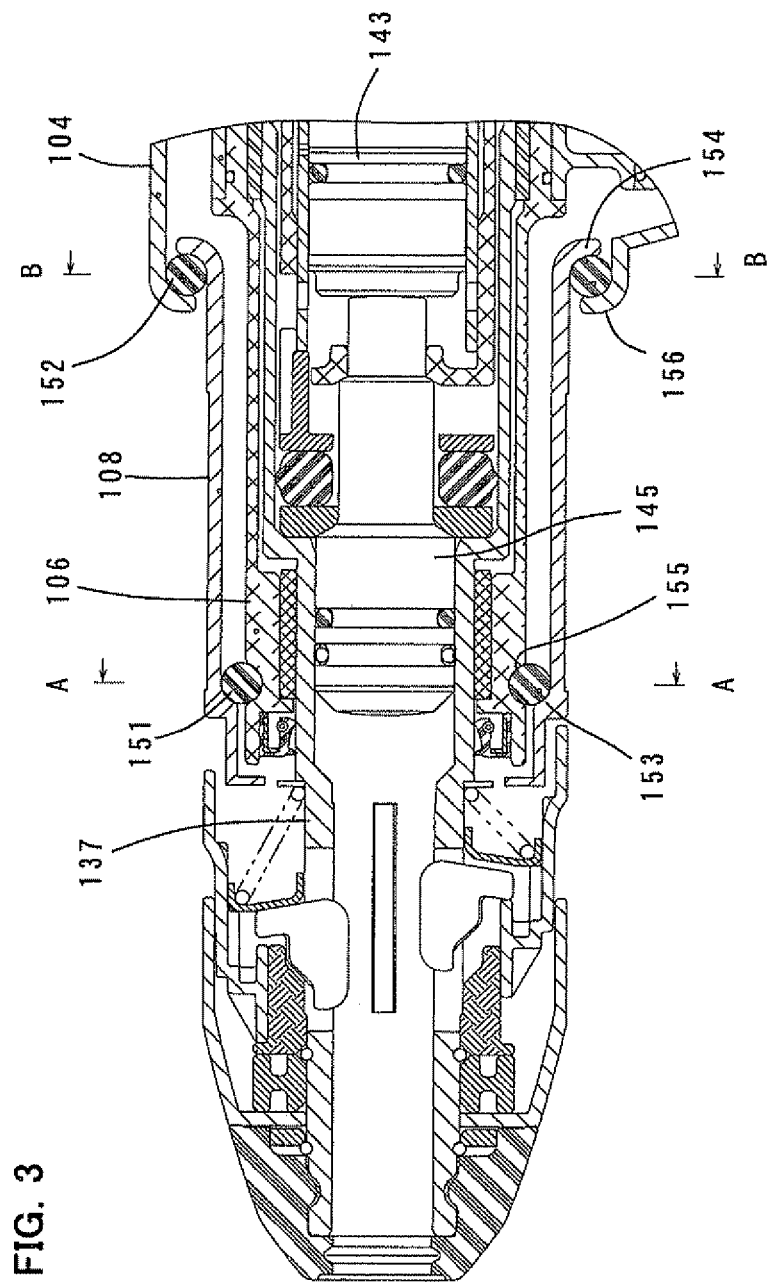
FIG. 3 is a sectional view showing a vibration-proofing structure of a side handle mounting member in the form of a barrel cover according to the first embodiment.
Figure 4:
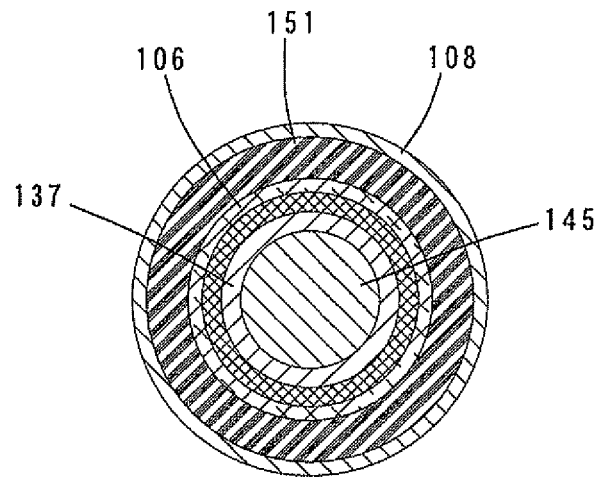
FIG. 4 is a sectional view taken along line A-A in FIG. 3.
Figure 5:
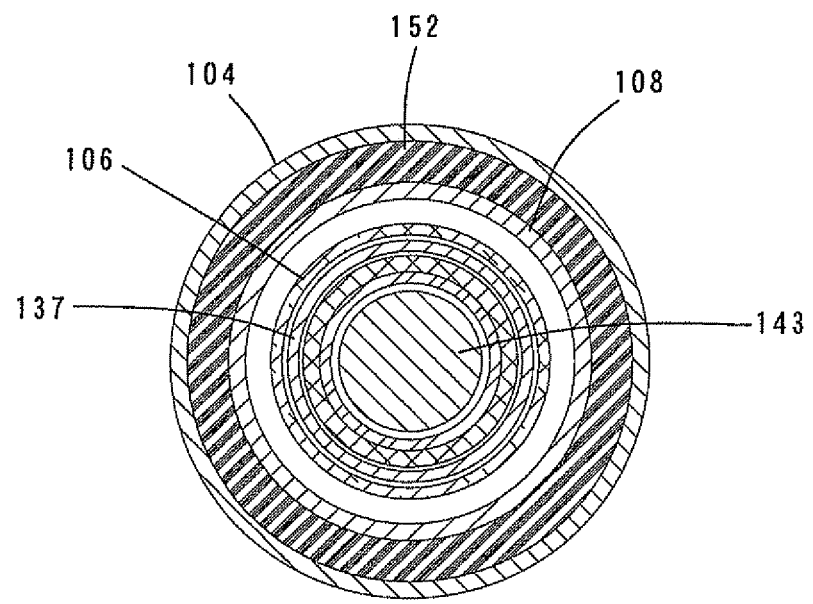
FIG. 5 is a sectional view taken along line B-B in FIG. 3.

As shown in FIGS. 3 to 5, the barrel cover 108 is a generally cylindrical member having both ends open in its longitudinal direction (the axial direction of the hammer bit 119) and arranged to cover the barrel 106 with a predetermined clearance between the barrel cover 108 and the outer circumferential surface of the barrel 106. The vibration-proofing structure of the barrel cover 108 according to this embodiment mainly includes elastically deformable front and rear rubber rings 151, 152 having a circular section and disposed between the barrel cover 108 and the barrel 106 and between the barrel cover 108 and the gear housing cover 104, respectively. Specifically, the barrel cover 108 is supported by the barrel 106 and the gear housing cover 104 in a floating state (in a non-contact state) via the front and rear rubber rings 151, 152. The front and rear rubber rings 151, 152 are features that correspond to the "longitudinally elastic element" according to this invention.

In order to receive the front rubber ring 151, a front rubber receiving part 153 is formed in the inner surface of a front portion of the barrel cover 108 and a rubber receiving part 155 is fainted in the outer surface of a front portion of the barrel 106. Further, in order to receive the rear rubber ring 152, a rear rubber receiving part 154 is formed in the outer surface of a rear portion of the barrel cover 108 and a rubber receiving part 156 is formed in the inner surface of a front portion of the gear housing cover 104. The rubber receiving part 155 of the barrel 106 is a groove having a generally semicircular section, formed in the outer circumferential surface of the front end portion of the barrel 106 and extending in the circumferential direction. The front rubber receiving part 153 of the barrel cover 108 is formed by a protruding edge protruding inward from the inner circumferential surface of the front portion of the barrel cover 108 over its entire circumference and having a circular arc engagement surface for engagement with the front rubber ring 151.

The front rubber ring 151 is disposed between the rubber receiving part 155 of the barrel 106 and the front rubber receiving part 153 of the barrel cover 108. An inner circumferential surface of the front rubber ring 151 is held in contact with the groove of the rubber receiving part 155 over the range of about 180 degrees of the circular section of the ring. Further, a front portion of an outer circumferential surface of the front rubber ring 151 is held in contact with the front rubber receiving part 153 over the range of about 90 degrees of the circular section of the ring.

The rear end of the barrel cover 108 is inserted from a front end opening of the gear housing cover 104 into the gear housing cover 104, and the rear rubber receiving part 154 is formed on this rear end. The rear rubber receiving part 154 is a circular arc flange formed by a rear end portion of the barrel cover 108 and protruding radially outward from the barrel cover 108 over its entire circumference. The opening of the gear housing cover 104 is circular, and the rubber receiving part 156 is formed in the edge of the opening. The rubber receiving part 156 of the gear housing cover 104 is a circular arc flange formed by the opening end of the gear housing cover 104 and protruding radially inward from the gear housing cover 104 over its entire circumference. The rubber receiving part 156 is placed in front of the rear rubber receiving part 154 of the barrel cover 108 and opposed to it.

The rear rubber ring 152 is disposed between the rear rubber receiving part 154 of the barrel cover 108 and the rubber receiving part 156 of the gear housing cover 104. The circular arc surface of the rear rubber receiving part 154 of the barrel cover 108 receives a rear portion of an inner circumferential surface of the rear rubber ring 152, and the circular arc surface of the rubber receiving part 156 of the gear housing cover 104 receives a front portion of an outer circumferential surface of the rear rubber ring 152. The rear rubber receiving part 154 of the barrel cover 108 and the rubber receiving part 156 of the gear housing cover 104 protrude in radially opposite directions and each of their protruding ends extends beyond the center of the circular section of the rear rubber ring 152, so that the receiving parts 154, 156 hold the rear rubber ring 152 there between from the rear and the front. The front and rear rubber rings 151, 152 and the rubber receiving parts 153, 154, 155, 156 for receiving the rubber rings form a vibration-proofing part of the barrel cover 108.

The hammer drill 101 according to this embodiment is constructed as described above. During operation by the hammer drill 101, impulsive and cyclic vibration is caused in the body 103, but transmission of the vibration from the body 103 to the barrel cover 108 or to the side handle 110 is reduced by elastic deformation of the rubber rings 151, 152. In the following description, a z-axis is taken along the axial direction of the hammer bit 119 or the longitudinal direction of the power tool body, a y-axis is taken along the vertical direction perpendicular to the z-axis, and an x-axis is taken along the horizontal direction perpendicular to the z-axis or the lateral direction of the power tool body.

When vibration is inputted from the body 103 or from the barrel 106 and the gear housing cover 104 to the barrel cover 108 in the direction of the z-axis, the front rubber ring 151 receives forward input and the rear rubber ring 152 receives rearward input. In this case, in this embodiment, due to the construction in which the rubber receiving part 155 of the barrel 106 receives the inner circumferential surface of the front rubber ring 151 and the front rubber receiving part 153 of the barrel cover 108 receives the outer circumferential surface of the front rubber ring 151, the front rubber ring 151 is acted upon by a force mainly in a shearing direction. As for the rear rubber ring 152, due to the construction in which the rear rubber receiving part 154 of the barrel cover 108 and the rubber receiving part 156 of the gear housing cover 104 hold the rear rubber ring 152 there between from the rear and the front, the rear rubber ring 152 is acted upon by a force mainly in a compressing direction. Therefore, deformation of the front rubber ring 151 appears mainly in the form of shearing deformation and deformation of the rear rubber ring 152 appears mainly in the form of compressive deformation, and transmission of vibration from the barrel 106 and the gear housing cover 104 to the barrel cover 108 can be reduced by a vibration damping action caused by these deformations. The construction can be changed such that deformation of the rear rubber ring 152 appears in the form of shearing deformation, or such that deformation of the front rubber ring 151 appears in the form of compressive deformation. Specifically, a construction in which shearing deformation appears in one of the front and rear rubber rings and compressive deformation appears in the other, or a construction in which shearing deformation or compressive deformation appears in the both rubber rings can be appropriately selected.

When vibration is inputted in the direction of the y-axis or the direction of the x-axis, due to the construction in which the front and rear rubber rings 151, 152 are held between the barrel cover 108 and the barrel 106 and between the barrel cover 108 and the gear housing cover 104 in the radial direction, the front and rear rubber rings 151, 152 are acted upon by forces in the compressing direction. Therefore, deformation of both of the front and rear rubber rings 151, 152 appears in the form of compressive deformation, and transmission of vibration from the barrel 106 and the gear housing cover 104 to the barrel cover 108 can be reduced by a vibration damping action caused by this deformation.

Thus, according to this embodiment, transmission of vibration from the barrel 106 and the gear housing cover 104 to the barrel cover 108, or transmission of vibration from the body 103 to the side handle 110 can be reduced in the three directions of the z-, y- and x-axes.

In this embodiment, a vibration-proofing structure is additionally provided on the barrel cover 108 for mounting the side handle 110. Therefore, as a matter of course, it is not necessary to provide a vibration-proofing structure on the side handle 110 which is mounted to the barrel cover 108. Therefore, in the case of a construction like the hammer drill 101 in which the bar-shaped side handle 110 and the D-shaped side handle 110 can be appropriately used according to the operation modes, the manufacturing costs of the side handles 110 can be reduced because it is not necessary to provide a vibration-proofing structure for each of the side handles 110.

Further, with the construction in which the two rubber rings 151, 152 are disposed between the barrel cover 108 and the barrel 106 and between the barrel cover 108 and the gear housing cover 104, the vibration-proofing structure can be formed of a smaller number of parts and can be made simpler in structure.

Further, in this embodiment, preferably, a mechanism for preventing the barrel cover 108 from moving in its circumferential direction with respect to the barrel 106 and the gear housing cover 104 is provided. As an example, which is not shown, it may be constructed such that one rotation preventing rib on the inner circumferential surface of the barrel cover 108 and another rotation preventing rib on the outer surface of the barrel 106 come in contact with each other in the circumferential direction, so that relative movement of the barrel cover 108 in the circumferential direction can be prevented.

(Second Embodiment of the Invention)

A second embodiment of the invention is now described with reference to FIGS. 6 and 7. This embodiment is a modification relating to the vibration-proofing structure of the barrel cover 108. The overall structure of the hammer drill 101 is identical to that of the first embodiment and therefore its description is omitted. In this embodiment, transmission of vibration can be reduced not only in the three directions of the z-, y- and x-axes, but also in the circumferential direction of the hammer bit 119 (in the direction of rotation around the z-axis).

Figure 6:
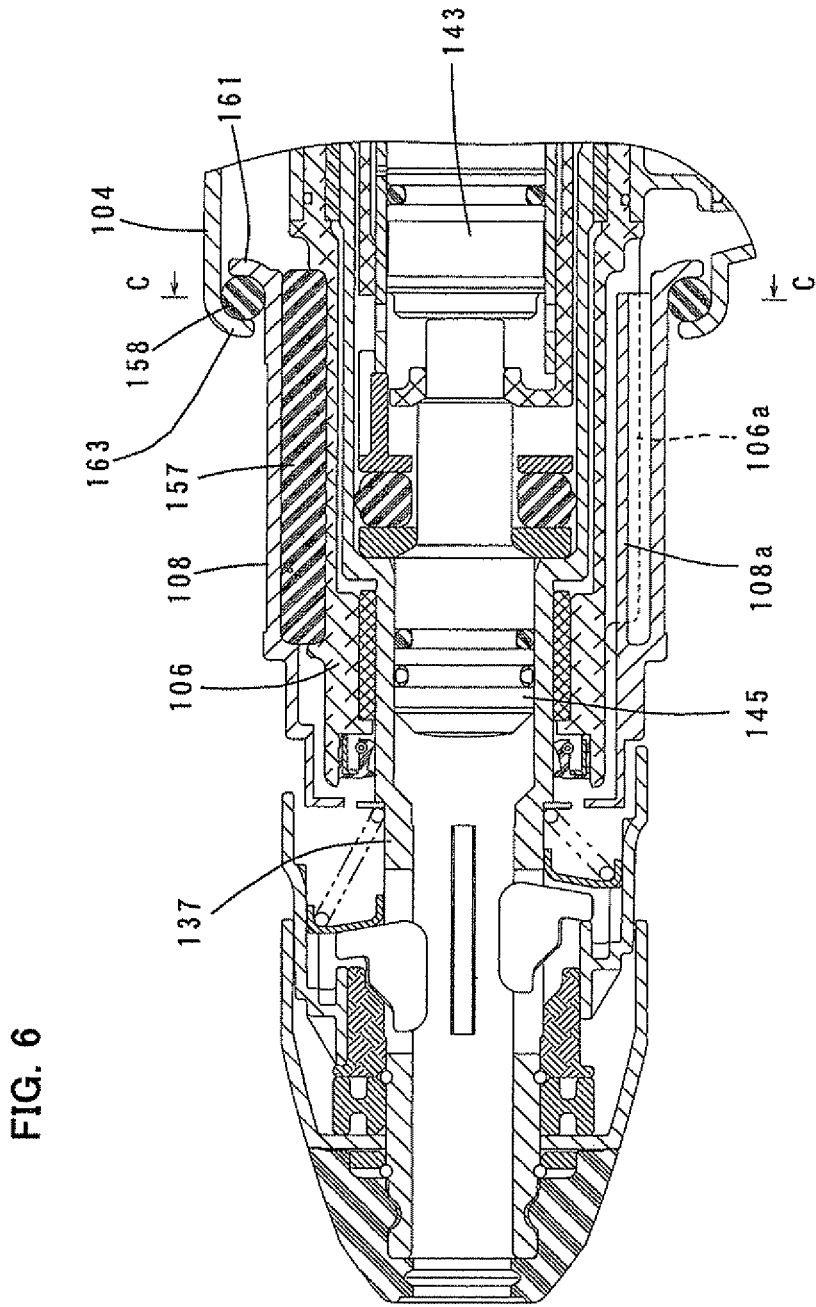
FIG. 6 is a sectional view showing a vibration-proofing structure of a barrel cover according to a second embodiment of this invention.
Figure 7:
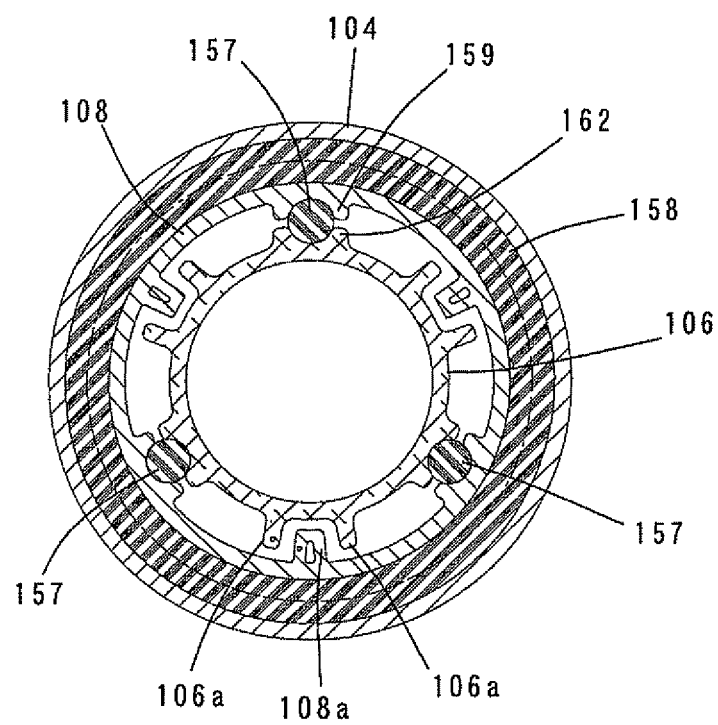
FIG. 7 is a sectional view taken along line C-C in FIG. 6.

In this embodiment, as shown in FIGS. 6 and 7, three elastically deformable rubber pins 157 of a generally cylindrical shape are provided between the barrel cover 108 and the barrel 106 and equidistantly spaced apart from each other in the circumferential direction of the barrel cover 108 (the circumferential direction of the hammer bit 119). Further, a rubber ring 158 is disposed between the barrel cover 108 and the gear housing cover 104. The rubber pin 157 is a feature that corresponds to the "longitudinally elastic element" and the "circumferentially elastic element", and the rubber ring 158 is a feature that corresponds to the "longitudinally elastic element" according to this invention.

The rubber pins 157 extend along the length of the barrel cover 108. In order to receive the rubber pins 157, three front rubber receiving parts 159 are formed on the inner surface of the barrel cover 108 and equidistantly spaced apart from each other in the circumferential direction, and rubber receiving parts 162 are formed on the outer surface of the barrel 106 and opposed to the front rubber receiving parts 159 of the barrel cover 108. The front rubber receiving parts 159 of the barrel cover 108 and the rubber receiving parts 162 of the barrel 106 each have a recess having a generally semicircular section, shaped to correspond to the contour of the rubber pins 157 and extending in the longitudinal direction. The rubber pins 157 are fitted in the recesses. Therefore, side wall surfaces of the recesses of the front rubber receiving parts 159 and the rubber receiving parts 162 prevent the rubber pins 157 from moving in the circumferential direction. Further, mating surfaces of the front rubber receiving parts 159 of the barrel cover 108 and the rubber receiving parts 162 of the barrel 106 are opposed to each other with a predetermined clearance, so that the rubber pins 157 are allowed to deform in the radial direction of the barrel cover.

Like in the first embodiment, the rubber ring 158 is disposed between a rear rubber receiving part 161 of the barrel cover 108 and a rubber receiving part 163 of the gear housing cover 104. A circular arc surface of the rear rubber receiving part 161 of the barrel cover 108 receives a rear portion of an inner circumferential surface of the rubber ring 158, and a circular arc surface of the rubber receiving part 163 of the gear housing cover 104 receives a front portion of an outer circumferential surface of the rubber ring 158.

Therefore, the barrel cover 108 is prevented by the rubber pins 157 and the rubber ring 158 from moving in the three directions of the z-, y- and x-axes with respect to the barrel 106 and the gear housing cover 104 and also prevented by the rubber pins 157 from moving in the circumferential direction with respect to the barrel 106 and the gear housing cover 104.

The vibration-proofing structure of the barrel cover according to this embodiment is constructed as described above. Therefore, during operation by the hammer drill 101, transmission of vibration from the barrel 106 and the gear housing cover 104 to the barrel cover 108, or transmission of vibration from the body 103 to the side handle 110 can be reduced not only in the three directions of the z-, y- and x-axes like in the above-described first embodiment, but also in the circumferential direction. In this embodiment, with the construction in which the rubber pins 157 have a function of preventing vibration in the three directions of the z-, y- and x-axes and a function of preventing vibration in the circumferential direction, compared with a construction in which a structure for proofing vibration in the three directions of the z-, y- and x-axes and a structure for proofing vibration in the circumferential direction are separately provided, the vibration-proofing structure can be formed of a smaller number of parts and can be made simpler in structure.

Further, in this embodiment, as for the circumferential direction, the rubber pins 157 are acted upon by a force in a shearing direction via the front rubber receiving parts 159 of the barrel cover 108 and the rubber receiving parts 162 of the barrel 106. Thus, the vibration-proofing structure can be realized by utilizing shearing deformation which has a higher vibration reducing effect than compressive deformation.

Further, in this embodiment, like in the first embodiment, the barrel cover 108 for mounting the side handle 110 is additionally provided with a vibration-proofing structure. Therefore, it is not necessary to provide a vibration-proofing structure on the side handle 110, so that the manufacturing costs of the side handle 110 can be reduced.

Further, in this embodiment, a plurality of ribs 108a, 106a are formed on the inner surface of the barrel cover 108 and the outer surface of the barrel 106 with predetermined spacing in the circumferential direction and serve as stoppers for limiting maximum relative movement of the barrel cover 108 in its circumferential direction by engagement with each other in the circumferential direction of the barrel cover 108. Therefore, in the event of a shear failure of the rubber pin 157, the maximum relative movement of the barrel cover 108 with respect to the barrel 106 can be limited in the circumferential direction.

(Third Embodiment of the Invention)

Figure 8:
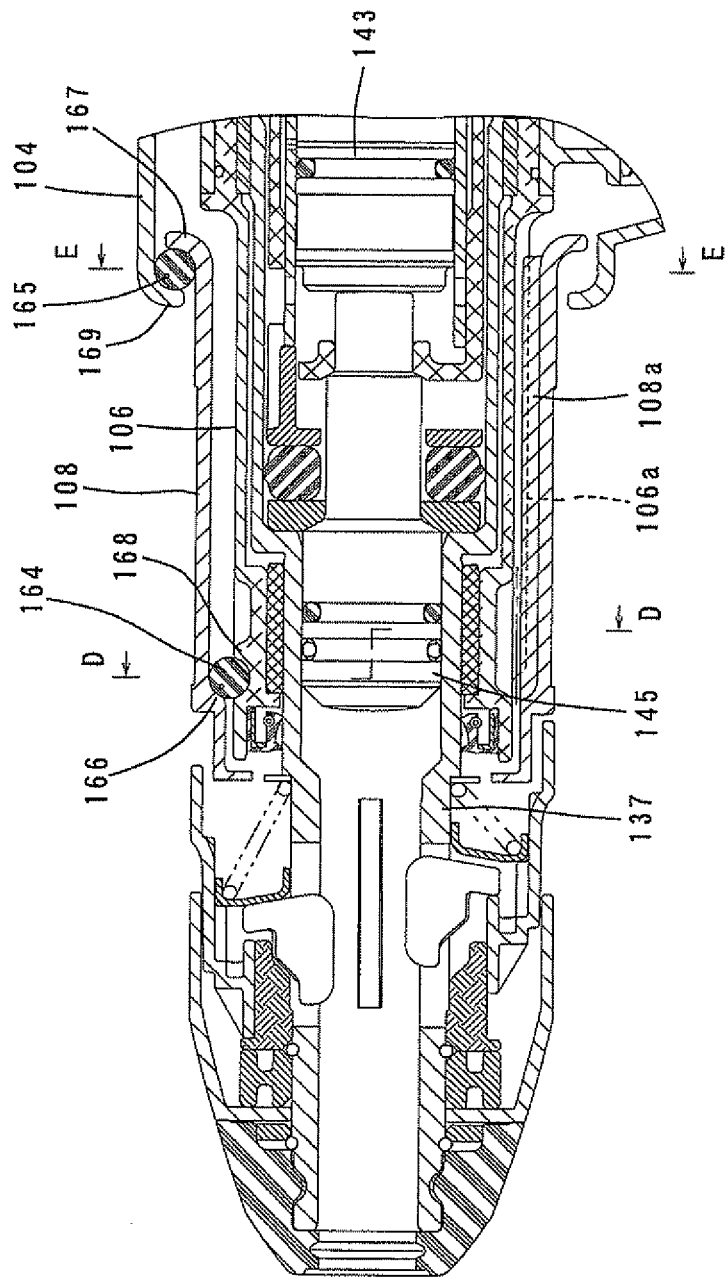
FIG. 8 is a sectional view showing a vibration-proofing structure of a barrel cover according to a third embodiment of this invention.
Figure 9:
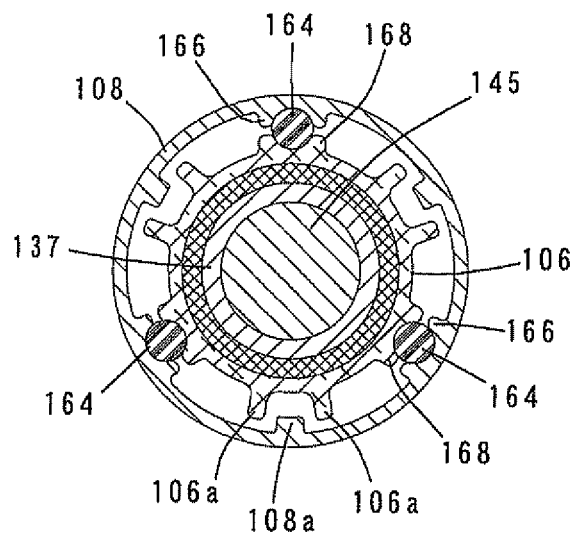
FIG. 9 is a sectional view taken along line D-D in FIG. 8.
Figure 10:
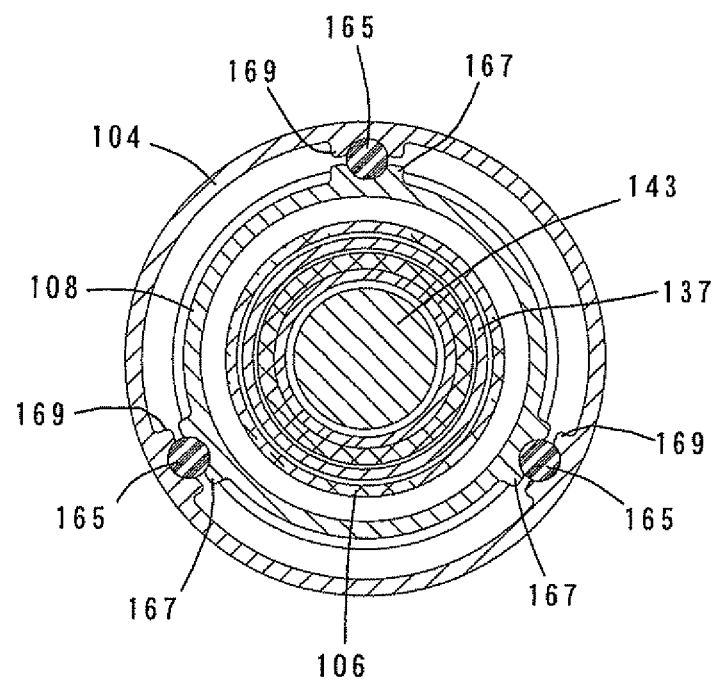
FIG. 10 is a sectional view taken along line E-E in FIG. 8.

A third embodiment of the invention is now described with reference to FIGS. 8 to 10. In this embodiment, elastically deformable rubber balls 164 and elastically deformable rubber balls 165 are used in place of the rubber pins 157 and the rubber ring 158 of the above-described second embodiment, respectively. Specifically, three each of elastically deformable front and rear rubber balls 164, 165 of a spherical shape are provided between the barrel cover 108 and the barrel 106 and between the barrel cover 108 and the gear housing cover 104, respectively, and equidistantly spaced apart from each other in the circumferential direction. Correspondingly, each of front and rear rubber receiving parts 166, 167 of the barrel cover 108, rubber receiving parts 168 of the barrel 106 and rubber receiving parts 169 of the gear housing cover 104 has a recess having a concave spherical surface. The front and rear rubber balls 164, 165 are features that correspond to the "longitudinally elastic element" and the "circumferentially elastic element" according to this invention.

According to the third embodiment constructed as described above, the same effect as the second embodiment can be obtained. Further, also in this embodiment, like in the second embodiment, a plurality of ribs 108a, 106a are formed on the inner surface of the barrel cover 108 and the outer surface of the barrel 106 with predetermined spacing in the circumferential direction and serve as stoppers for limiting maximum relative movement of the barrel cover 108 in its circumferential direction by engagement with each other in the circumferential direction of the barrel cover 108. Therefore, in the event of a shear failure of the rubber pin 157, the maximum relative movement of the barrel cover 108 with respect to the barrel 106 can be limited in the circumferential direction.

(Fourth Embodiment of the Invention)

Figure 11:
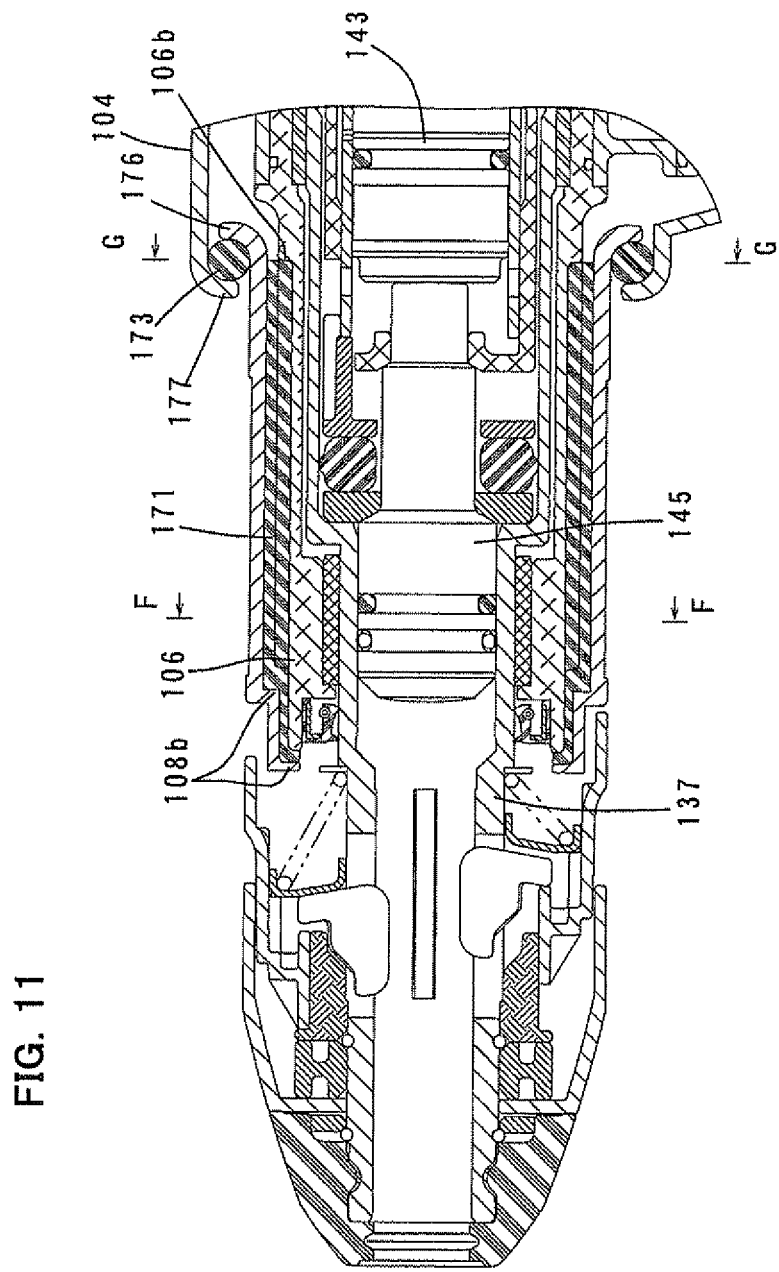
FIG. 11 is a sectional view showing a vibration-proofing structure of a barrel cover according to a fourth embodiment of this invention.
Figure 12:
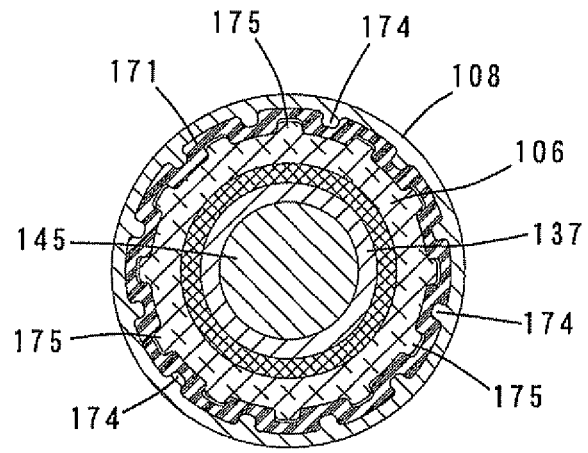
FIG. 12 is a sectional view taken along line F-F in FIG. 11.
Figure 13:
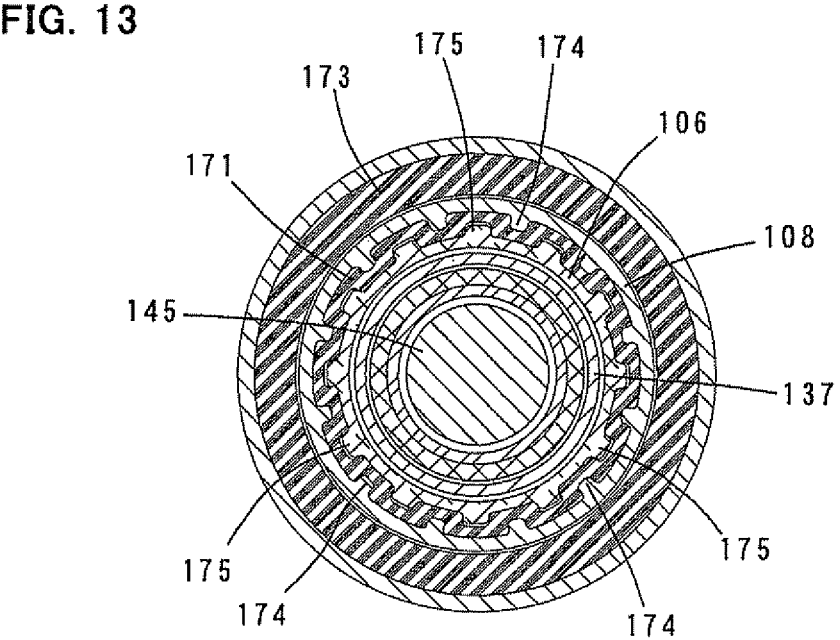
FIG. 13 is a sectional view taken along line G-G in FIG. 11.

A fourth embodiment of the invention is now described with reference to FIGS. 11 to 13. Elastically deformable elastomer 171 is disposed between the inner circumferential surface of the barrel cover 108 and an outer circumferential surface of the barrel 106 and extends substantially along the entire length of the barrel cover 108 in the longitudinal direction. Further, an elastically deformable rubber ring 173 is disposed between the barrel cover 108 and the gear housing cover 104. In this embodiment, the elastomer 171 is integrally bonded to the inner circumferential surface of the barrel cover 108. A front end surface of the elastomer 171 in the longitudinal direction is held in contact with a flange 108b formed on a front end portion of the barrel cover 108 and protruding radially inward. A rear end surface of the elastomer 171 in the longitudinal direction is held in contact with a radial engagement part 106b formed on the barrel 106.

Further, a plurality of ridges 174 are formed on the inner circumferential surface of the barrel cover 108 with predetermined spacing in the circumferential direction, extend in the longitudinal direction of the barrel cover 108 and protrude radially inward. Further, a plurality of ridges 175 are formed on the outer circumferential surface of the barrel 106 with predetermined spacing in the circumferential direction, extend in the longitudinal direction and protrude radially outward such that the ridges 175 lie between the cover-side ridges 174. The ridges 174, 175 are engaged in the elastomer 171 in the radial direction. Thus, the barrel cover 108 is allowed to move with respect to the barrel 106 not only in the three directions of the z-, y- and x-axes, but also in the circumferential direction by elastic deformation of the elastomer 171. Further, like in the above-described first embodiment, the rubber ring 173 is received by a rubber receiving part 176 formed on the rear end of the barrel cover 108 and a rubber receiving part 177 formed on the front end of the gear housing cover 104. The elastomer 171 is a feature that corresponds to the "longitudinally elastic element" and the "circumferentially elastic element", and the rubber ring 173 is a feature that corresponds to the "longitudinally elastic element" according to this invention.

According to the fourth embodiment constructed as described above, substantially the same effect as the above-described second or third embodiment can be obtained.

(Fifth Embodiment of the Invention)

Figure 14:
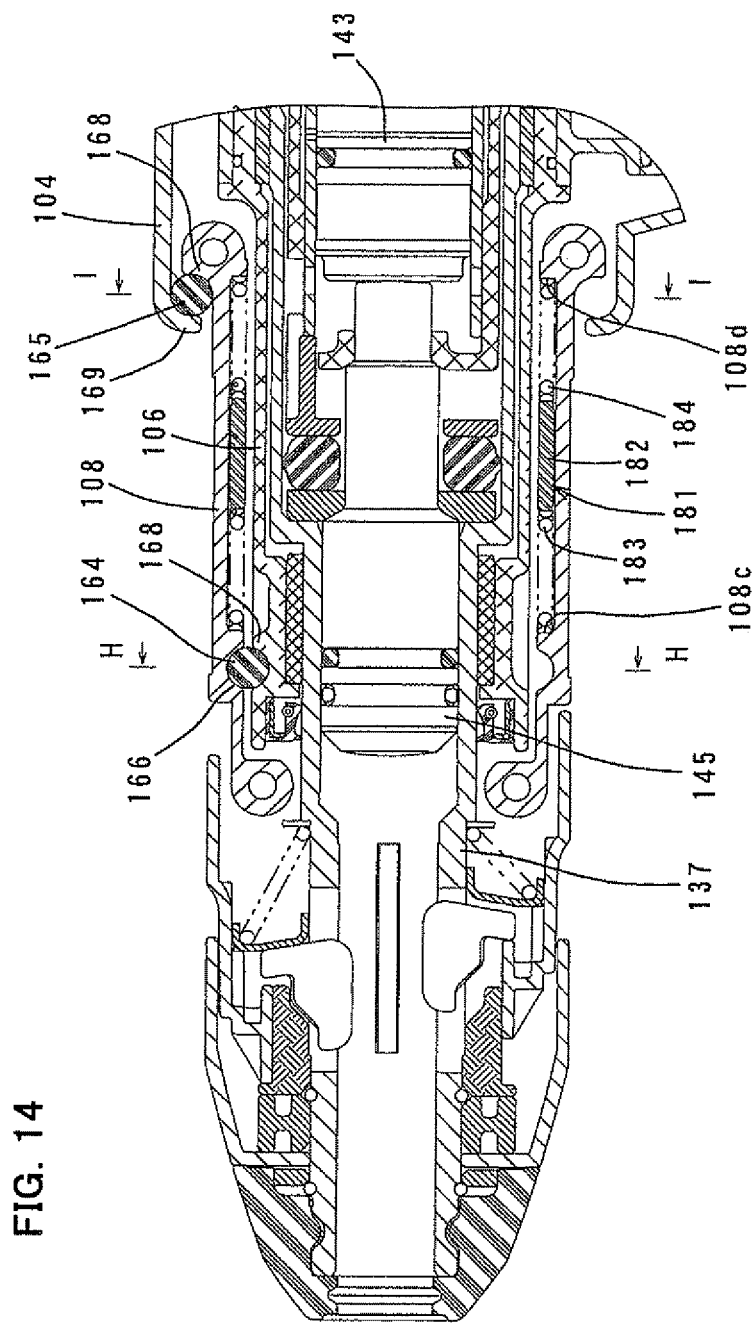
FIG. 14 is a sectional view showing a vibration-proofing structure of a barrel cover according to a fifth embodiment of this invention.
Figure 15:
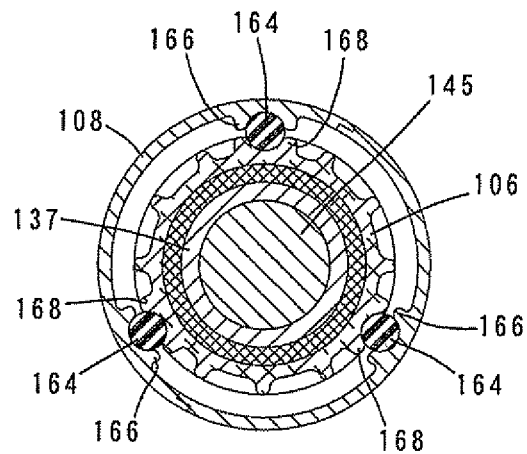
FIG. 15 is a sectional view taken along line H-H in FIG. 14.
Figure 16:
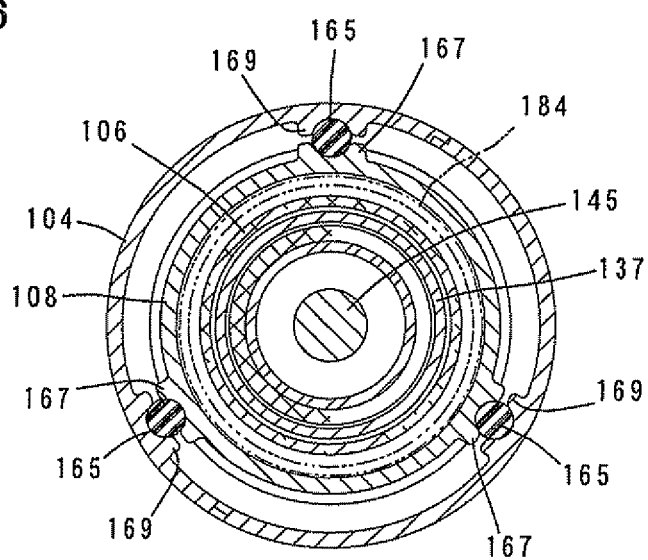
FIG. 16 is a sectional view taken along line I-I in FIG. 14.

A fifth embodiment of the invention is now described with reference to FIGS. 14 to 16. In this embodiment, in addition to the construction of the above-described third embodiment in which the barrel cover 108 is connected to the barrel 106 and the gear housing cover 104 via the front and rear rubber balls 164, 165, a dynamic vibration reducer 181 is installed in the barrel cover 108. Components which are substantially identical to those in the third embodiment are given like numerals as in the third embodiment and will not be described.

The dynamic vibration reducer 181 is disposed by utilizing a space between the barrel cover 108 and the barrel 106 and mounted to the inner surface of the barrel cover 108. The dynamic vibration reducer 181 mainly includes an annular weight 182 for vibration reduction and front and rear coil springs 183, 184 disposed on the front and rear sides of the weight 182 in the axial direction of the hammer bit (the longitudinal direction of the barrel cover 108). The front coil spring 183 is disposed between a front spring receiving part 108c formed on the barrel cover 108 and a front end face of the weight 182. The rear coil spring 184 is disposed between a rear spring receiving part 108d formed on the barrel cover 108 and a rear end face of the weight 182. The front and rear coil springs 183, 184 exert biasing forces on the weight 182 toward each other in the axial direction of the hammer bit.

This embodiment is constructed as described above. Therefore, the same effect as the third embodiment or the same effect as the second embodiment can be obtained. In addition, a vibration reducing effect can be obtained by the dynamic vibration reducer 181. Specifically, even if the front and rear rubber balls 164, 165 cannot completely absorb vibration so that the barrel cover 108 vibrates, the weight 182 and the front and rear coil springs 183, 184 serve as vibration reducing elements in the dynamic vibration reducer 181 and cooperate to passively reduce vibration of the barrel cover 108. Thus, vibration caused in the barrel cover 108 can be reduced or alleviated.

(Sixth Embodiment of the Invention)

Figure 17:
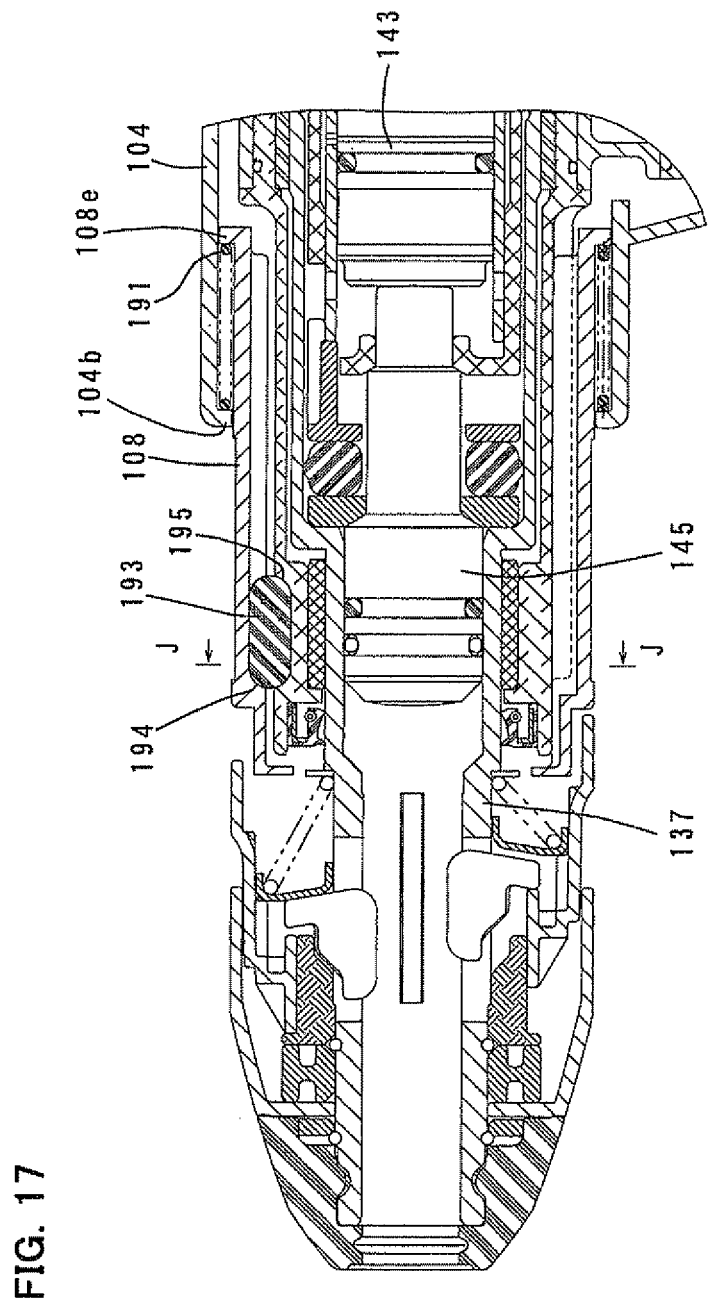
FIG. 17 is a sectional view showing a vibration-proofing structure of a barrel cover according to a sixth embodiment of this invention.
Figure 18:
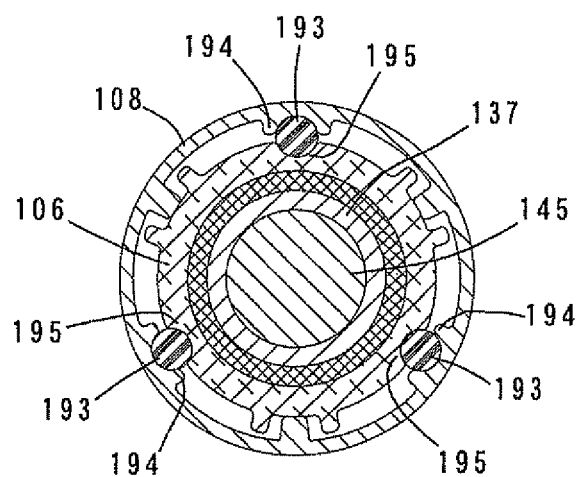
FIG. 18 is a sectional view taken along line J-J in FIG. 17.

A sixth embodiment of the invention is now described with reference to FIGS. 17 and 18. In this embodiment, as to a vibration-proofing structure of the barrel cover 108, a compression coil spring 191 and rubber pins 193 are used for vibration proofing in the three directions of the z-, y- and x-axes and in the circumferential direction.

The compression coil spring 191 is disposed in a space between the outer circumferential surface of the barrel cover 108 and the inner circumferential surface of the gear housing cover 104. One end of the compression coil spring 191 is locked on a spring receiving part 108e formed on the barrel cover 108, and the other end is locked on a spring receiving part 104b formed on the gear housing cover 104. Thus, the compression coil spring 191 biases the barrel cover 108 rearward in the direction of the z-axis (the axial direction of the hammer bit). Specifically, the compression coil spring 191 prevents the barrel cover 108 from moving forward. Three rubber pins 193 are disposed between the barrel cover 108 and the barrel 106, equidistantly spaced apart from each other in the circumferential direction of the barrel cover 108, and received by front rubber receiving parts 194 of the barrel cover 108 and rubber receiving parts 195 of the barrel 106. The front rubber receiving parts 194 of the barrel cover 108 and the rubber receiving parts 195 of the barrel 106a have the same configuration as the corresponding parts of the second embodiment, except that their length in the direction of the z-axis is shorter. Therefore, the rubber pins 193 prevent the barrel cover 108 from moving rearward in the direction of the z-axis, moving in the directions of the y- and x-axes and in the circumferential direction.

This embodiment is constructed as described above and can realize vibration proofing of the barrel cover 108 or the side handle 110 in the three directions of the z-, y- and x-axes and in the circumferential direction around the z-axis, by using rubber (the rubber pins 193) and a spring (the compression coil spring 191) in combination.

In the above-described embodiments, the hammer drill is described as a representative example of the power tool. However, the invention may also be applied to a hammer which performs an operation only by striking movement of the hammer bit 119 in its axial direction, or to a cutting power tool, such as a reciprocating saw and a jig saw, which performs a cutting operation on a workpiece by reciprocating movement of a blade.

Further, variants of the examples shown in the drawings can be appropriately provided. For example, the vibration-proofing structure can be constructed by a combination of rubber pins and rubber balls or by a combination of rubber pins or by a combination of rubber balls and a compression coil spring, or the dynamic vibration reducer described in the fifth embodiment may be provided in the first and third embodiments.

Further, in each of the above-described embodiments, the barrel cover 108 is described as a side handle mounting member for the side handle 110, but it may be constructed such that the barrel cover 108 is used as an auxiliary handle. Specifically, it may be constructed such that the barrel cover 108 is directly held by user's hand as an auxiliary handle.

DESCRIPTION OF NUMERALS 101 hammer drill (power tool)
103 body (power tool body)
104 gear housing cover
104a rib
105 motor housing
106 barrel
106a rib
106b radial engagement part
107 gear housing
108a rib
108b flange
108c front spring receiving part
108d rear spring receiving part
108 barrel cover 109 handgrip
110 side handle
111 driving motor
113 motion converting mechanism
115 striking mechanism
117 power transmitting mechanism
119 hammer bit (tool bit)
129 piston
137 tool holder
141 cylinder
141a air chamber
143 striker
145 impact bolt
151 front rubber ring (longitudinally elastic element)
152 rear rubber ring (longitudinally elastic element)
153 front rubber receiving part
154 rear rubber receiving part
155 rubber receiving part
156 rubber receiving part
157 rubber pin (longitudinally elastic element, circumferentially elastic element)
158 rubber ring (longitudinally elastic element)
159 front rubber receiving part
161 rear rubber receiving part
162 rubber receiving part
163 rubber receiving part
164 front rubber ball (longitudinally elastic element, circumferentially elastic element)
165 rear rubber ball (longitudinally elastic element, circumferentially elastic element)
166 front rubber receiving part
167 rear rubber receiving part
168 rubber receiving part
169 rubber receiving part
171 elastomer (longitudinally elastic element, circumferentially elastic element)
173 rubber ring (longitudinally elastic element)
174 cover-side ridge
175 barrel-side ridge
181 dynamic vibration reducer
182 weight
183 front coil spring
184 rear coil spring
191 compression coil spring (longitudinally elastic element)
193 rubber pin (longitudinally elastic element, circumferentially elastic element)
194 front rubber receiving part
195 rubber receiving part

The invention claimed is:

1. A hand-held power tool which performs an operation by linear movement of a tool bit in an axial direction of the tool bit comprising:
a power tool body having a front end region to which the tool bit is mounted,
a main handle disposed on a rear end of the power tool body opposite from the tool bit,
an auxiliary-handle mounting member to which an auxiliary handle is mounted, and
a longitudinally elastic element disposed between the main handle and the auxiliary-handle mounting member in the axial direction of the tool bit, wherein
the longitudinally elastic element is elastically deformed in the axial direction, and
the auxiliary-handle mounting member is allowed to move with respect to the power tool body in the axial direction of the tool bit by elastic deformation of the elastic element so that transmission of vibration from the power tool body to the auxiliary-handle mounting member in the axial direction is reduced.

2. The hand-held power tool as defined in claim 1, further comprising a circumferentially elastic element that is disposed between the power tool body and the auxiliary-handle mounting member in a circumferential direction of the tool bit and can elastically deform in the circumferential direction, wherein the auxiliary-handle mounting member is allowed to move with respect to the power tool body in the circumferential direction of the tool bit by elastic deformation of the circumferentially elastic element so that transmission of vibration from the power tool body to the auxiliary-handle mounting member in the circumferential direction is reduced.

3. The hand-held power tool as defined in claim 2, wherein the circumferentially elastic element and the longitudinally elastic element are a single, unitary elastic element.

4. The hand-held power tool as defined in claim 2, wherein at least three circumferentially elastic elements are equidistantly spaced apart from each other in the circumferential direction of the power tool body.

5. The hand-held power tool as defined in claim 1, the longitudinally elastic element further comprising first and second longitudinally elastic elements, wherein the first longitudinally elastic element is acted upon by a shearing force between the power tool body and the auxiliary-handle mounting member, while the second longitudinally elastic element is acted upon by a compressing force in the axial direction between the power tool body and the auxiliary-handle mounting member.

6. The hand-held power tool as defined in claim 1, wherein the longitudinally elastic element is shaped like a ring.

7. The hand-held power tool as defined in claim 1, wherein the longitudinally elastic element is cylindrically shaped.

8. The hand-held power tool as defined in claim 1, wherein the longitudinally elastic element is spherically shaped.

9. The hand-held power tool as defined in claim 1, the auxiliary-handle mounting member further comprising an elongate member extending in the axial direction, wherein the longitudinally elastic element comprises elastomer which is disposed between the power tool body and the auxiliary-handle mounting member and extends substantially along an entire length of the auxiliary-handle mounting member in its longitudinal direction.

10. The hand-held power tool as defined in claim 1, wherein the auxiliary-handle mounting member is provided with a dynamic vibration reducer for reducing vibration which is inputted from the power tool body to the auxiliary-handle mounting member.

11. A hand-held power tool which performs an operation by linear movement of a tool hit in an axial direction of the tool bit comprising:
a power tool body having a front end region to which the tool bit can be mounted,
a main handle that is disposed on a rear end side of the power tool body opposite from the tool bit,
an auxiliary handle which can be directly held by a user's hand, and
a longitudinally elastic element that is disposed between the power tool body and the auxiliary handle in the axial direction of the tool bit and can elastically deform in the axial direction, wherein:
the power tool body has a cylindrical barrel on the front end side, and
the auxiliary handle includes a cylindrical barrel cover which covers the barrel and is allowed to move with respect to the barrel in the axial direction of the tool bit by elastic deformation of the longitudinally elastic element, so that transmission of vibration from the barrel to the barrel cover in the axial direction is reduced.

* * * * *